United States Patent

Sato et al.

[11] Patent Number: 5,804,096
[45] Date of Patent: Sep. 8, 1998

[54] REFRIGERATING MACHINE OIL

[75] Inventors: Takehisa Sato; Satoshi Ogano; Toshiaki Kuribayashi, all of Ohi-Machi, Japan

[73] Assignee: Tonen Corporation, Tokyo, Japan

[21] Appl. No.: 689,990

[22] PCT Filed: May 9, 1994

[86] PCT No.: PCT/JP94/00747

§ 371 Date: Dec. 15, 1994

§ 102(e) Date: Dec. 15, 1994

[87] PCT Pub. No.: WO94/28092

PCT Pub. Date: Dec. 8, 1994

Related U.S. Application Data

[63] Continuation of Ser. No. 351,397, Dec. 15, 1994, abandoned.

[30] Foreign Application Priority Data

May 27, 1993  [JP]  Japan .................................... 5-125591
Sep. 29, 1993  [JP]  Japan .................................... 5-242524

[51] Int. Cl.$^6$ .................................................... C09K 5/04
[52] U.S. Cl. ............................................................ 252/68
[58] Field of Search ............................ 252/68; 508/492, 508/485, 496, 506

[56] References Cited

U.S. PATENT DOCUMENTS

| | | | |
|---|---|---|---|
| 5,096,606 | 3/1992 | Hagihara et al. | 252/68 |
| 5,185,092 | 2/1993 | Fukuda et al. | 252/68 |
| 5,211,884 | 5/1993 | Bunemann et al. | 252/56 S |
| 5,294,356 | 3/1994 | Tanaka et al. | 252/68 |
| 5,374,366 | 12/1994 | Nakahara et al. | 252/68 |
| 5,395,544 | 3/1995 | Hagihara et al. | 252/68 |
| 5,403,503 | 4/1995 | Seiki et al. | 252/52 A |

FOREIGN PATENT DOCUMENTS

| | | |
|---|---|---|
| 485979 | 5/1992 | European Pat. Off. . |
| 45-35045 | 11/1970 | Japan . |
| 9012849 | 11/1990 | WIPO . |

*Primary Examiner*—Alan Diamond
*Attorney, Agent, or Firm*—Richard D. Jordan

[57] ABSTRACT

A first refrigerating machine oil of the present invention has a sodium and/or potassium concentration of not higher than 0.1 ppm. Since it has low hydrolyzability and excellent insulating properties, the first refrigerating machine oil is useful as a refrigerating machine oil composition for refrigerators having a hermetic compressor. A second refrigerating machine oil of the present invention is composed mainly of an ester of pentaerythritol and a carboxylic acid. The carboxylic acid is a mixed carboxylic acid composed of 3,5,5-trimethylhexanoic acid and a straight-chain or branched fatty acid having from 6 to 8 carbon atoms. The proportion of 3,5,5-trimethylhexanoic acid in the mixed carboxylic acid is in the range of from more than 50 mol % to not more than 90 mol %. The second refrigerating machine oil has high viscosity and high electrical insulating properties, which are required for refrigerating machine oils as used for large-sized air conditioning equipment and room air conditioners, and is non-crystallizable at low temperature and hence superior in handleability.

8 Claims, 1 Drawing Sheet

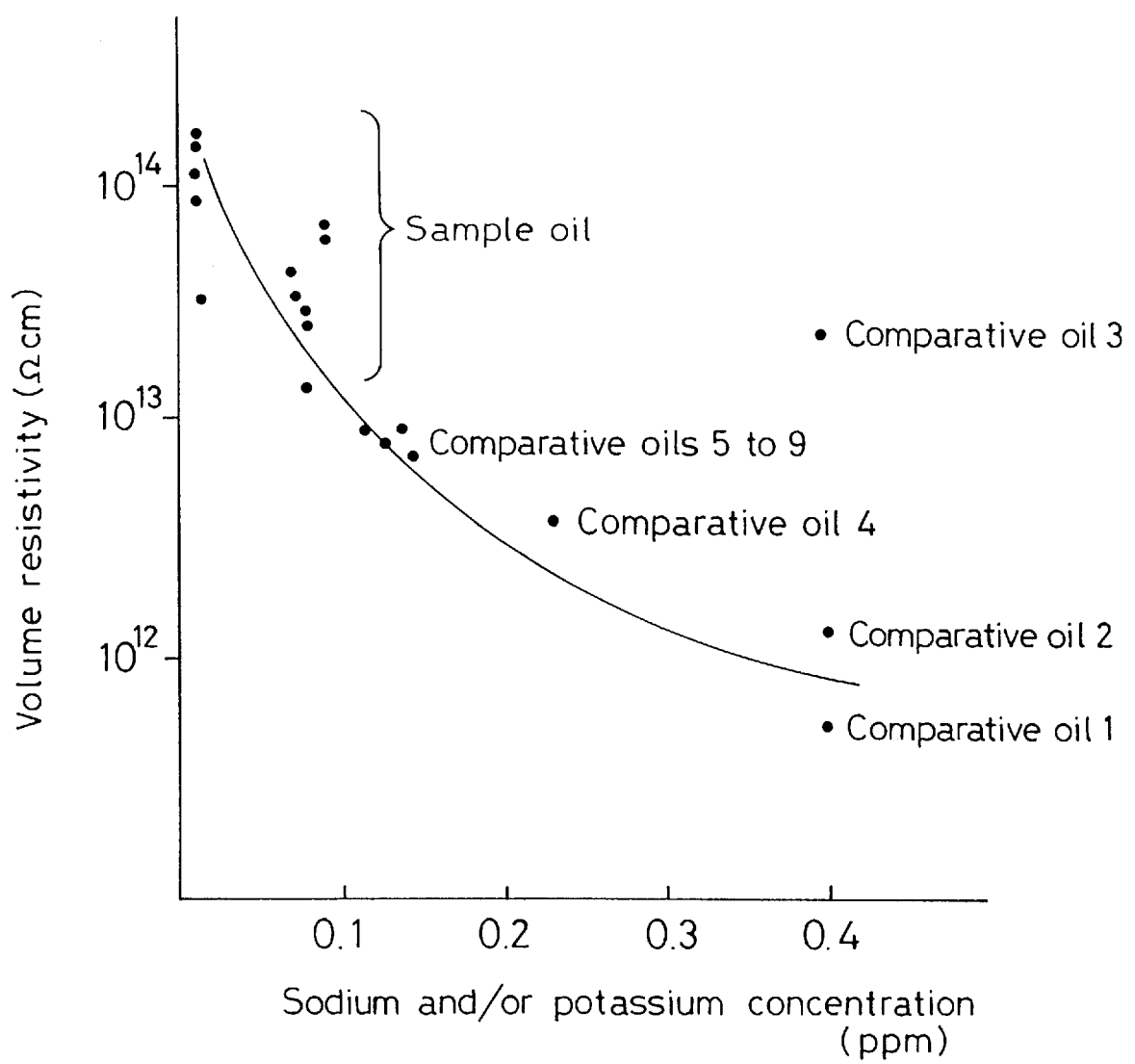

REFRIGERATING MACHINE OIL

This is a continuation, of application Ser. No. 08/351,397, filed Dec. 15, 1994, now abandoned which is a 371 of Pct/JP94/00747 filed May 9, 1994.

TECHNICAL FIELD

The present invention relates to refrigerating machine oils which are used in refrigerating machines using a non-chlorine, fluorine-containing refrigerant, and which are excellent in hydrolytic stability and insulating properties and particularly superior in properties for use in large-sized air conditioning equipment, room air conditioners and refrigerators.

BACKGROUND ART

In refrigerating machines, chlorine-containing refrigerants, e.g., R11 ($CCl_3F$), R12 ($CCl_2F_2$), R123 ($CF_3CHCl_2$), R22 ($CHClF_2$), etc., have heretofore been used as refrigerants. However, development of substitutional Freons has become a matter of great urgency from the environmental point of view, and attention has recently been paid to non-chlorine, fluorine-containing refrigerants, e.g., 1,1,1,2-tetrafluoro ethane (R134a) and so forth. Consequently, it has been proposed to employ ester oils, which are excellent in both compatibility with R134a and thermal stability, as refrigerating machine oils from the viewpoint of compatibility with R134a and also from the viewpoint of thermal stability required for refrigerating machine oils as a result of the recent achievement of high efficiency of refrigerating machines.

However, a refrigerating machine oil used in a refrigerating machine, for example, for a refrigerator having a hermetic compressor with a motor immersed in the refrigerating machine oil is required to have a volume resistivity of $1 \times 10^{13}$ Ω-cm (25° C.) or higher in general (in the state of being mixed with additives) because there is a danger of electrical leakage if the electrical insulating properties are low. In this regard, conventional refrigerating machine oils for chlorine-containing refrigerants involve no particular problem because these oils use a base oil having a relatively high volume resistivity [$1 \times 10^{14}$ Ω-cm (25° C.) or higher], e.g., mineral oil, alkylbenzene, etc. However, commercially available ester oils, which are compatible with non-chlorine, fluorine-containing refrigerants, generally have a volume resistivity in the range of from $1 \times 10^{11}$ Ω-cm to $1 \times 10^{13}$ Ω-cm (25° C.). Particularly, high-viscosity ester oils whose viscosity is about 70 $mm^2/s$ at 40° C. have a volume resistivity as low as $1 \times 10^{12}$ Ω-cm (25° C.). Therefore, such ester oils give rise to a problem when used as refrigerating machine oils with non-chlorine, fluorine-containing refrigerants substituted for chlorine-containing refrigerants, as described above.

Japanese Patent Application Laid-Open (KOKAI) No. 4-72390 (1992), for example, discloses a refrigerating machine oil using a hindered polyol ester oil having a specific group as an ester oil compatible with non-chlorine, fluorine-containing refrigerants, e.g., R134a. Further, pentaerythritol esters have been put to practical use as refrigerating machine oils for electric refrigerators. However, the viscosity of these ester oils is as low as 32 $mm^2/s$ at 40° C. Therefore, these ester oils cannot suitably be used as refrigerating machine oils for large-sized air conditioning equipment or room air conditioners, which require a high-viscosity ester oil having a viscosity of 68 $mm^2/s$ or higher at 40° C., for example. Among the ester oils, an ester of pentaerythritol and 3,5,5-trimethylhexanoic acid makes it possible to maintain compatibility with non-chlorine, fluorine-containing refrigerants and electrical insulating properties and to achieve high viscosity. However, it has become clear that the above-described ester crystallizes at low temperature and involves a problem in terms of handleability.

A first object of the present invention is to provide a refrigerating machine oil for use in refrigerating machines using non-chlorine, fluorine-containing refrigerants, e.g., R134a, which is particularly excellent in insulating properties and hydrolytic stability.

A second object of the present invention is to provide a refrigerating machine oil for use in refrigerating machines using non-chlorine, fluorine-containing refrigerants, e.g., R134a, which is, particularly, capable of maintaining compatibility with such a non-chlorine, fluorine-containing refrigerant and electrical insulating properties and yet non-crystallizable at low temperature and hence superior in handleability.

DISCLOSURE OF THE INVENTION

The first refrigerating machine oil of the present invention is characterized by comprising an ester oil having a sodium and/or potassium concentration of not higher than 0.1 ppm.

In addition, the first refrigerating machine oil of the present invention is a refrigerating machine oil comprising an ester oil and an additive, which is characterized in that the sodium and/or potassium concentration in the refrigerating machine oil is not higher than 0.1 ppm.

In addition, the first refrigerating machine oil is characterized in that the additive is a phosphate compound.

The first refrigerating machine oil of the present invention has been accomplished on the basis of the finding that insulating properties become extremely low when the overall concentration of sodium and potassium in the ash content, which is considered to be contained in the raw material of an ester oil and an additive or to be mixed therein by a neutralizing agent or the like used in the purification process, exceeds 0.1 ppm. Thus, a refrigerating machine oil which is excellent in insulating properties and hydrolytic stability can be obtained by setting the sodium and/or potassium concentration at not higher than 0.1 ppm.

The second refrigerating machine oil of the present invention is a refrigerating machine oil composed mainly of an ester of pentaerythritol and a carboxylic acid, which is characterized in that the carboxylic acid is a mixed carboxylic acid composed of 3,5,5-trimethylhexanoic acid and a straight-chain or branched fatty acid having from 6 to 8 carbon atoms, and the proportion of 3,5,5-trimethylhexanoic acid in the mixed carboxylic acid is in the range of from more than 50 mol % to not more than 90 mol %.

The second refrigerating machine oil of the present invention is based on the finding that it is possible to obtain a refrigerating machine oil which has a high viscosity and high electrical insulating properties, which are required for refrigerating machine oils as used for large-sized air conditioning equipment and room air conditioners, and which is non-crystallizable at low temperature and hence superior in handleability, by using as an acid component in a pentaerythritol ester a mixed carboxylic acid composed of 3,5,5-trimethylhexanoic acid and a straight-chain or branched fatty acid having from 6 to 8 carbon atoms, in which the proportion of 3,5,5-trimethylhexanoic acid is in the range of from more than 50 mol % to not more than 90 mol %.

BRIEF DESCRIPTION OF THE DRAWING

FIG. 1 is a graph for explanation of the relationship between the sodium and/or potassium concentration and volume resistivity in the first refrigerating machine oil of the present invention.

BEST MODE FOR CARRYING OUT THE INVENTION

Examples of ester oils usable in the first refrigerating

Examples of ester oils usable in the first refrigerating machine oil of the present invention as the main component include polyol esters, polycarboxylates, fumarate oligomers, carbonic acid esters, hydroxypivalates, and combinations of these esters. First, examples of polyol esters will be shown below.

(1) Polyol esters formed from an aliphatic polyhydric alcohol and a straight-chain or branched fatty acid:

Examples of aliphatic polyhydric alcohols usable to form these polyesters are trimethylolpropane, ditrimethylolpropane, trimethylolethane, ditrimethylolethane, pentaerythritol, dipentaerythritol, tripentaerythritol, etc.

Examples of usable fatty acids are those which have from 3 to 12 carbon atoms. Preferable fatty acids are propionic acid, butyric acid, valeric acid, hexanoic acid, octanoic acid, nonanoic acid, decanoic acid, dodecanoic acid, isovaleric acid, neopentanoic acid, 2-methylbutyric acid, 2-ethylbutyric acid, 2-methylhexanoic acid, 2-ethylhexanoic acid, isooctanoic acid, isononanoic acid, isodecanoic acid, 2,2'-dimethyloctanoic acid, 2-butyloctanoic acid, 3,5,5-trimethylhexanoic acid, etc.

It is also possible to use partial esters formed from an aliphatic polyhydric alcohol and a straight-chain or branched fatty acid.

Examples of aliphatic polyhydric alcohols usable to form such partial esters are trimethylolpropane, ditrimethylolpropane, trimethylolethane, ditrimethylolethane, pentaerythritol, dipentaerythritol, tripentaerythritol, etc. Examples of usable fatty acids are those which have from 3 to 9 carbon atoms. Preferable fatty acids are propionic acid, butyric acid, valeric acid, hexanoic acid, heptanoic acid, octanoic acid, nonanoic acid, 2-methylhexanoic acid, 2-ethylhexanoic acid, isooctanoic acid, isononanoic acid, isodecanoic acid, 2,2'-dimethyloctanoic acid, 2-butyloctanoic acid, 3,5,5-trimethylhexanoic acid, etc.

Particularly preferable esters are those which are formed from pentaerythritol, dipentaerythritol or tripentaerythritol and a fatty acid having from 5 to 12 carbon atoms, more preferably from 5 to 9 carbon atoms, e.g., valeric acid, hexanoic acid, heptanoic acid, 2-methylhexanoic acid, 2-ethylhexanoic acid, isooctanoic acid, isononanoic acid, isodecanoic acid, 2,2'-dimethyloctanoic acid, 2-butyloctanoic acid, 3,5,5-trimethylhexanoic acid, or a mixture of these fatty acids.

A partial ester can be obtained by allowing an aliphatic polyhydric alcohol and a fatty acid to react with each other with the number of moles for reaction properly adjusted.

(2) Diesters formed from neopentyl glycol and a straight-chain or branched fatty acid having from 6 to 9 carbon atoms:

Examples of straight-chain or branched fatty acids having from 6 to 9 carbon atoms include hexanoic acid, heptanoic acid, octanoic acid, nonanoic acid, 2-ethylbutyric acid, 2-methylhexanoic acid, 2-ethylhexanoic acid, isooctanoic acid, isononanoic acid, 3,5,5-trimethylhexanoic acid, etc.

(3) Complex esters composed of a partial ester which is formed from an aliphatic polyhydric alcohol and a straight-chain or branched fatty acid having from 3 to 12 carbon atoms, and a straight-chain or branched aliphatic or aromatic dibasic acid:

Examples of aliphatic polyhydric alcohols usable to form such complex esters are trimethylolpropane, trimethylolethane, pentaerythritol, dipentaerythritol, etc.

Examples of usable fatty acids having from 3 to 12 carbon atoms are propionic acid, butyric acid, isobutyric acid, valeric acid, hexanoic acid, heptanoic acid, octanoic acid, nonanoic acid, decanoic acid, dodecanoic acid, 2-methylhexanoic acid, 2-ethylhexanoic acid, isooctanoic acid, isononanoic acid, isodecanoic acid, 2,2'-dimethyloctanoic acid, 2-butyloctanoic acid, 3,5,5-trimethylhexanoic acid, etc.

In these complex esters, it is preferable to use fatty acids having from 5 to 7 carbon atoms, more preferably 5 or 6 carbon atoms. Examples of such fatty acids include valeric acid, hexanoic acid, isovaleric acid, 2-methylbutyric acid, 2-ethylbutyric acid, and a mixture of these fatty acids. A fatty acid which is formed by mixing together a fatty acid having 5 carbon atoms and a fatty acid having 6 carbon atoms in the ratio of from 10:90 to 90:10 can be suitably used.

Examples of aliphatic dibasic acids preferably used for esterification with a polyhydric alcohol, together with a fatty acid as stated above, include succinic acid, adipic acid, pimelic acid, suberic acid, azelaic acid, sebacic acid, dibasic undecanoic acid, dibasic dodecanoic acid, dibasic tridecanoic acid, carboxyoctadecanoic acid, carboxymethyloctadecanoic acid, dibasic docosanoic acid, etc. Examples of aromatic dibasic acids include phthalic acid and isophthalic acid. Examples of aromatic tribasic acids include trimellitic acid and so forth. Examples of aromatic tetrabasic acids include pyromellitic acid and so forth.

Esterification reaction may be carried out as follows: A polyhydric alcohol and an aliphatic or aromatic dibasic acid are allowed to react with each other in a predetermined ratio to form a partially esterified product, and thereafter the partially esterified product is allowed to react with a fatty acid. Alternatively, the acid reaction sequence may be reversed. It is also possible to mix together the acids for esterification.

(4) Dialkyl esters formed from straight-chain or branched aliphatic dibasic acids (number of carbon atoms: from 16 to 22):

Examples of aliphatic dibasic acids include succinic acid, glutaric acid, adipic acid, pimelic acid, suberic acid, azelaic acid, sebacic acid, dibasic undecanoic acid, dibasic dodecanoic acid, dibasic tridecanoic acid, carboxyoctadecanoic acid, carboxymethyloctadecanoic acid, dibasic docosanoic acid, and other aliphatic dibasic acids having properties equal to those of the acids stated above. Preferable aliphatic dibasic acids are succinic acid, adipic acid, sebacic acid, dibasic undecanoic acid, dibasic dodecanoic acid, carboxyoctadecanoic acid, carboxymethyloctadecanoic acid, etc.

The alcohol component is an alcohol having from 5 to 8 carbon atoms. Specific examples of such alcohols include amyl alcohol, hexyl alcohol, heptyl alcohol, octyl alcohol, and isomers of these alcohols. Preferable alcohols are isoamyl alcohol, isohexyl alcohol, and octyl alcohol.

Particularly preferable esters are dioctyl adipate, diisoheptyl adipate, dihexyl sebacate, diheptyl succinate, etc.

(5) Dialkyl esters formed from aromatic dibasic acids (number of carbon atoms: from 18 to 26):

Examples of aromatic dibasic acids include phthalic acid, isophthalic acid, and aromatic dibasic acids having properties equal to those of these acids. The alcohol component is an alcohol having from 5 to 8 carbon atoms. Examples usable alcohols include amyl alcohol, hexyl alcohol, heptyl alcohol, octyl alcohol, and isomers of these alcohols. Preferable alcohols are isoamyl alcohol, isoheptyl alcohol, and octyl alcohol.

Particularly preferable esters are dioctyl phthalate, diisoheptyl phthalate, diisoamyl phthalate, etc.

(6) Diesters obtained by using as an alcohol an adduct of a monohydric alcohol, which is selected from among methanol, ethanol, propanol, butanol, and isomers of these alcohols, with from 1 mole to 10 moles, preferably from 1 mole to 6 moles, of an alkylene oxide selected, for example, from among ethylene oxide, propylene oxide, butylene oxide, amylene oxide, and isomers of these oxides, and further using as an acid an aliphatic dibasic acid, e.g., adipic acid, pimelic acid, suberic acid, azelaic acid, sebacic acid, dibasic undecanoic acid, dibasic dodecanoic acid, carboxyoctadecanoic acid, carboxymethyloctadecanoic acid, dibasic docosanoic acid, etc, or an aromatic dibasic acid, e.g., phthalic acid.

In addition, esters obtained by using as an alcohol an adduct of a polyhydric alcohol, e.g., glycerin, trimethylolpropane, etc., with from 1 mole to 10 moles of an alkylene oxide selected, for example, from among ethylene oxide, propylene oxide, butylene oxide, amylene oxide, and isomers of these oxides, and further using as an acid a straight-chain or branched fatty acid having from 3 to 12 carbon atoms, e.g., propionic acid, butyric acid, valeric acid, hexanoic acid, heptanoic, acid, octanoic acid, nonanoic acid, decanoic acid, dodecanoic acid, 2-methylhexanoic acid, 2-ethylhexanoic acid, isooctanoic acid, isononanoic acid, isodecanoic acid, 2,2'-dimethyloctanoic acid, 2-butyloctanoic acid, etc.

In the foregoing description, esters which may be used in the first refrigerating machine oil of the present invention have been stated. As a fatty acid in each of the above esters, a straight-chain or branched fatty acid may be used. However, if a branched fatty acid is used, a refrigerating machine oil which is even more excellent in hydrolytic stability can be obtained.

In the first refrigerating machine oil of the present invention, an ester may be used alone, but it is preferable to properly combine it with another ester having a different viscosity in order to adjust the viscosity in a range conformable to each of various use applications, as described later. For example, in a case where one of the above described complex type esters (3) is used, and the viscosity is excessively high, an ester oil which is formed from an aliphatic polyhydric alcohol and a fatty acid having from 3 to 9 carbon atoms and which has a viscosity of not higher than 32 mm2/s at 40° C. may be added to the complex type ester so that the viscosity falls within a range conformable to the use application. When the viscosity is excessively low, a polymer should be added to an organic carboxylate oil to thereby adjust the viscosity. In this case, it is preferable to use a polymer having a viscosity of not lower than 70 mm$^2$/s at 40° C.

Examples of such polymers include polyalkyl methacrylates (e.g., one in which the alkyl group has from 1 to 8 carbon atoms), polyalkylene glycols (e.g., polypropylene glycol, a copolymer formed from a polyethylene glycol component and a polypropylene glycol component, a copolymer formed from a polypropylene glycol component and a polytetramethylene glycol component, etc.), and a polyester formed from neopentyl glycol and an aliphatic dibasic acid and represented by the following formula (I):

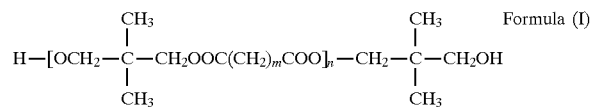

There is no particular restriction on the amount of polymer added as long as an ester oil having a desired viscosity can be obtained. In general, however, the amount of polymer added may be in the range of from 1% to 99% by weight.

It is also possible to use polycarboxylates, fumarate oligomers, carbonic acid esters, and hydroxypivalates, besides the above-described esters.

Examples of polycarboxylates include those in which the polycarboxylic acid is an aliphatic alicyclic polycarboxylic acid, e.g., 1,2,3,4-butanetetracarboxylic acid, cyclohexanecarboxylic acid, 1,4-cyclohexanecarboxylic acid, etc., or an aromatic polycarboxylic acid, e.g., trimellitic acid, pyromellitic acid, etc., and in which the alcohol is a monohydric alcohol containing a straight-chain or branched alkyl group having from 3 to 12 carbon atoms, or a monool of polyalkylene glycol represented by formula (II):

(wherein A is an alkylene group having from 2 to 8 carbon atoms; R is an alkyl group having from 1 to 10 carbon atoms; and n is an integer of from 1 to 10.)

It is also possible to use complex esters obtained by esterification reaction of the above-described polycarboxylic acids and alcohols, together with a polyhydric alcohol, e.g., ethylene glycol, propylene glycol, etc., which is additionally used.

Examples of fumarate oligomers are homopolymers of fumarates, or copolymers of fumarates and unsaturated aliphatic hydrocarbons, which are represented by the following formula (III). Each end of the molecule in formula (III) is a residue of a polymerization initiator used for the polymerization reaction, which is omitted in the formula.

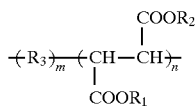

Formula (III)

(wherein $R_1$ and $R_2$, which may be identical or different, each represent a straight-chain or branched alkyl group having from 1 to 9 carbon atoms, an allyl group, or a terminal substituted or unsubstituted polyalkylene oxide group; $R_3$ represents an alkylene group, a substituted alkylene group, or an alkylene oxide group; m is an integer of 0 or higher; n is an integer of 1 or higher, preferably from 1 to 12; and $R_3$ is not more than 50 mol % of the whole.)

Specific examples are an ester oligomer of diethyl fumarate, an ester oligomer of dibutyl fumarate, etc.

It is also possible to use an alkyl fumarate copolymer containing from 1 mol % to 50 mol % a structural unit represented by the following formula (IV):

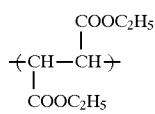

and from 50 mol % to 99 mol % a structural unit represented by the following formula (V):

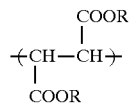

(wherein two R's, which are independent of each other, each represent a straight-chain or branched alkyl group having from 3 to 8 carbon atoms.)

As carbonic acid esters, it is possible to use those which are represented by formula (VI):

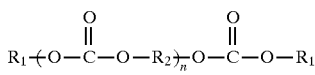

(wherein $R_1$ represents a straight-chain or branched alkyl group having from 2 to 10 carbon atoms; $R_2$ represents an alkylene group or cycloalkylene group having from 2 to 10 carbon atoms; and n is an integer of from 1 to 4.)

It is also possible to use carbonic acid esters represented by formula (VII):

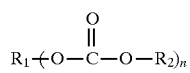

(wherein $R_1$ represents a polyhydric alcohol residue having from 2 to 6 hydroxyl groups; $R_2$ represents a straight-chain or branched alkyl group having from 2 to 10 carbon atoms; and n is an integer of from 2 to 6.)

The carbonic acid esters of the above formulae can be produced by ester exchange reaction of dimethyl carbonic acid esters with alcohols in the presence of a basic catalyst.

Further, it is possible to use carbonic acid esters represented by formula (VIII):

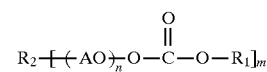

(wherein $R_1$ represents a straight-chain or branched alkyl group having from 1 to 10 carbon atoms; $R_2$ represents a straight-chain or branched alkyl group having from 2 to 10 carbon atoms; m is an integer of from 2 to 10; n is an integer of from 2 to 100; and —AO— is preferably —$CH_2$—CH ($CH_3$)—O— and may also be —$CH_2$—$CH_2$—O—.)

The above carbonic acid esters can be obtained by reaction of, for example, carbonic acid with alkylene oxide. The amount of alkylene oxide added is suitably in the range of from 2 moles to 3 moles. The alkylene oxide may be added in the form of ethylene oxide alone, or propylene oxide alone, or a mixture of such oxides.

Examples of hydroxypivalates are those which are represented by formula (IX):

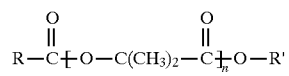

(wherein R and R' each represent a straight-chain or branched alkyl group having from 2 to 10 carbon atoms, and n is an integer of from 1 to 5.)

Esters are generally obtained by esterification reaction of alcohols with fatty acids in the presence of a phosphoric acid catalyst, for example. Esters obtained by this preparation have a total acid number in the range of from 0.1 to 0.5 mgKOH/g, an ash content (sodium content, potassium content, iron content, titanium content, silicon content, and so forth) in the range of from 5 to 50 ppm, and a water content in the range of from 300 to 1,000 ppm.

Although it is generally considered that the insulating properties of a lubricating oil depend on the acid number thereof and impurities contained therein, the present inventors have found that in the case of an ester oil, even if the acid number is high, the effect on the insulating properties is unexpectedly small, and not all the ash content in the ester oil has a correlation with the insulating properties.

That is, taking notice particularly of sodium and potassium contents with regard to substances causative of reduction in the volume resistivity of ester oils, we analyzed them on a scale several orders in magnitude smaller than the ordinary analytical level. As a result, it has become clear that the insulating properties become extremely low when the overall concentration of sodium and potassium contents in the ash content, which is considered to be contained in the raw material or to be mixed therein by a catalyst used in the synthesizing process or a neutralizing agent or the like used in the purification process, exceeds 0.1 ppm, although iron, titanium, silicon and so forth, which are contained in the ash content, have no large effect on the insulating properties.

Accordingly, to purify an ester oil, a purification means containing no component influencing the insulating properties is employed, and a method of avoiding the use of a compound having sodium as a constituent element is adopted because the sodium content is particularly difficult to remove by purification. By doing so, an ester exhibiting high insulating properties can be obtained with a reduced number of steps of purification process. As a method of avoiding the use of a compound containing sodium, it is useful to use calcium hydroxide, for example, for neutralization of a free fatty acid after the esterification reaction.

Thus, the first refrigerating machine oil of the present invention can be formed as a refrigerating machine oil having a volume resistivity of not lower than $1 \times 10^{13}$ Ω-cm (25° C.), preferably not lower than $5 \times 10^{13}$ Ω-cm (25° C.), more preferably not lower than $1 \times 10^{14}$ Ω-cm (25° C.).

Further, if the acid number is high, corrosion of metallic portions and other problems arise, and the ester oil is hydrolyzed, resulting in lowering of the insulating properties. Therefore, the total acid number should be less than 0.1 mgKOH/g, preferably not more than 0.05 mgKOH/g. The water content should be not higher than 500 ppm, preferably not higher than 100 ppm.

Further, with a view to enhancing the refrigerant stability, it is preferable to set the peroxide number at not higher than 1 meq./kg, the aldehyde number at not higher than 1 mgKOH/g, and the bromine number at not higher than 10 mg/100 g.

Purification of the ester should preferably be effected by contact treatment with silica gel, activated alumina, activated carbon, zeolite, etc. The contact conditions for the purification may be appropriately determined according to various circumstances. The temperature is preferably not higher than 100° C. As another ester purification method, a method that uses an ion exchange resin or an inorganic ion exchanger (manufactured by Toa Gosei Chemical Industry Co., Ltd.) may also be employed although this method causes a rise in the cost.

Next, the first refrigerating machine oil of the present invention contains an antiwear agent, an antioxidant, a corrosion inhibitor, an anti-foaming agent, a metal deactivator, a rust preventive, etc., and in regard to these additives also, the sodium and/or potassium concentration is important. That is, it is necessary that the sodium and/or potassium concentration in the refrigerating machine oil should be not higher than 0.1 ppm.

As an antiwear agent, a phosphate compound is preferably used. However, it has become clear that since a phosphate compound is usually produced by dehydrochlorination of phosphorus oxychloride and a phenol or an alcohol, the sodium and/or potassium concentration is made high by the neutralization process; therefore, such an antiwear agent causes a rise in the overall sodium and/or potassium concentration in the refrigerating machine oil, although it is merely an additive.

Examples of such phosphate compounds include phosphates, e.g., benzyldiphenyl phosphate, allyldiphenyl phosphate, triphenyl phosphate, tricresyl phosphate, ethyl diphenyl phosphate, tributyl phosphate, dibutyl phenyl phosphate, cresyl diphenyl phosphate, dicresyl phenyl phosphate, ethyl phenyl diphenyl phosphate, diethyl phenyl phenyl phosphate, propyl phenyl diphenyl phosphate, dipropyl phenyl phenyl phosphate, triethyl phenyl phosphate, tripropyl phenyl phosphate, butyl phenyl diphenyl phosphate, dibutyl phenyl phenyl phosphate, tributyl phenyl phosphate, etc., and phosphites, e.g., triisopropyl phosphite, diisopropyl phosphite, etc.

When these phosphate compounds are to be produced, it is preferable to employ neutralization and purification means whereby no sodium and/or potassium component is left, in the same way as in the case of the above-described ester oils. The sodium and/or potassium concentration of a phosphate compound should be such that when it is added to the refrigerating machine oil as an additive, the overall sodium and/or potassium concentration in the composition is not higher than 0.1 ppm.

In addition, it is also possible to use phosphorus compounds such as hexamethylphosphoric triamide, n-butyl-n-dioctyl phosphinate, di-n-butyl hexyl phosphonate, amine dibutyl phosphonate, dibutyl phosphoroamidate, etc.

It is also possible to use antiwear agents which are represented by the following formula:

(wherein R, which may be identical or different, represents an alkyl group, an allyl group, or a phenyl group.)

Specific examples include trialkyl phosphorothionate, triphenyl phosphorothionate, alkyl diallyl phosphorothionate, diphenyl sulfide, diphenyl disulfide, di-n-butyl sulfide, di-n-butyl disulfide, di-tert-dodecyl disulfide, di-tert-dodecyl trisulfide, sulfurized sperm oil, sulfurized dipentene, xanthic disulfide, first-grade alkyl zinc thiophosphate, second-grade alkyl zinc thiophosphate, alkyl-allyl zinc thiophosphate, allyl zinc thiophosphate, etc.

The above-described various antiwear agents may be used in the proportion of from 0.01% to 5% by weight, preferably from 0.1% to 3% by weight, to the ester oil. The above antiwear agents may be used alone or in combination of two or more of them.

Examples of usable antioxidants include: amine antioxidants, e.g., di(alkylphenyl)amine (in which the alkyl group has from 4 to 20 carbon atoms), phenyl-α-naphthylamine, alkyldiphenylamine (in which the alkyl group has from 4 to 20 carbon atoms), N-nitrosodiphenylamine, phenothiazine, N,N'-dinaphthyl-p-phenylenediamine, acridine, N-methylphenothiazine, N-ethylphenothiazine, dipyridylamine, diphenylamine, phenolamine, 2,6-di-t-butyl-α-dimethylaminoparacresol, etc.; phenol antioxidants, e.g., 2,6-di-t-butylparacresol, 4,4'-methylenebis(2,6-di-t-butylphenol), 2,6-di-t-butyl-4-N,N-dimethylaminomethylphenol, 2,6-di-t-butylphenol, etc.; and organic metallic compound antioxidants such as organic iron salts, e.g., iron octoate, ferrocene, iron naphthoate, etc., organic cerium salts, e.g., cerium naphthoate, cerium toluylate, etc., and organic zirconium salts, e.g., zirconium octoate and so forth. Further, phosphites, e.g., tridi-t-butyl phenyl phosphite, trioctyl phosphite, etc., may be used. The above antioxidants may be used alone or in combination of two or more of them so that a synergistic effect can be produced.

An antioxidant may be used in the proportion of from 0.001% to 5% by weight, preferably from 0.01% to 2% by weight, to the refrigerating machine oil.

Examples of usable corrosion inhibitors include isostearate, n-octadecyl ammonium stearate, Duomin T deoleate, lead naphthenate, sorbitan oleate, pentaerythritol oleate, oleyl sarcosine, alkylsuccinic acid, alkenylsuccinic acid, and derivatives of these compounds. Such a corrosion inhibitor may be used in the proportion of from 0.001% to 1.0% by weight, preferably from 0.01% to 0.5% by weight, to the refrigerating machine oil.

As an anti-foaming agent, silicone may be used in the proportion of from 0.0001% to 0.003% by weight, preferably from 0.0001% to 0.001% by weight, to the base oil.

Examples of metal deactivators include triazole derivatives in the present invention. In addition, it is also possible to use benzotriazole, thiadiazole, thiadiazole derivatives, triazole, triazole derivatives, dithiocarbamate, etc. Such a metal deactivator may be used in the proportion of from 0.01% to 10% by weight, preferably from 0.01% to 1.0% by weight, to the base oil.

Examples of rust preventives usable include succinic acid, succinates, oleic beef tallow amide, barium sulfonate, calcium sulfonate, etc. Such a rust preventive may be used in the proportion of from 0.01% to 10% by weight, preferably from 0.01% to 1.0% by weight.

Next, the viscosity of the first refrigerating machine oil of the present invention is in the range of from 10 mm$^2$/s to 500 mm$^2$/s, preferably from 20 mm$^2$/s to 480 mm$^2$/s, at 40° C. When used for refrigerators, for example, the first refrigerating machine oil of the present invention should have a viscosity in the range of from 10 mm$^2$/s to 40 mm$^2$/s, preferably from 15 mm$^2$/s to 35 mm$^2$/s, at 40° C. When used for car air conditioners, the first refrigerating machine oil of the present invention should have a viscosity in the range of from 40 mm$^2$/s to 500 mm$^2$/s. When used for reciprocating compressors of car air conditioners, the first refrigerating machine oil of the present invention should have a viscosity in the range of from 40 mm$^2$/s to 120 mm$^2$/s, preferably from 80 mm$^2$/s to 100 mm$^2$/s. When used for rotary compressors of car air conditioners, the first refrigerating machine oil of the present invention should have a viscosity in the range of from 80 mm$^2$/s to 500 mm$^2$/s, preferably from 100 mm$^2$ to 450 mm$^2$/s.

If the viscosity is less than 10 mm$^2$/s, the refrigerating machine oil is inferior in lubricating properties and seal properties because of the excessively low viscosity, although it exhibits high compatibility with the refrigerant at high temperature. Therefore, such a refrigerating machine oil cannot be used. Further, the thermal stability is unfavorably low. If the viscosity of the refrigerating machine oil exceeds 500 mm$^2$/s, the compatibility with the refrigerant lowers unfavorably. Even in the above viscosity range, the working viscosity range differs according to the type of machine for which the refrigerating machine oil is used, as described above. In use with refrigerators, if the viscosity exceeds 40 mm$^2$/s, the friction loss at sliding portions becomes unfavorably high. Further, in the case of reciprocating car air conditioners, if the viscosity is less than 40 mm$^2$/s, a problem in terms of lubricating properties arises, whereas, if the viscosity exceeds 120 mm$^2$/s, the friction loss at sliding portions becomes unfavorably high. In the case of rotary air conditioners, if the viscosity is less than 80 mm$^2$/s, a problem in terms of sealing properties arises, whereas, if the viscosity exceeds 500 mm$^2$/s, a problem in terms of compatibility with the refrigerant arises.

Although in the foregoing description the present invention has been explained with regard to a refrigerating machine oil that uses an ester oil as a principal component thereof, the sodium and/or potassium concentration should also be lowered in a case where polyalkylene glycol is used as a refrigerating machine oil principal component.

The present invention will be described below by way of specific examples and comparative examples. First, methods of measuring impurity contents, volume resistivity and hydrolytic stability of refrigerating machine oil will be described.

(Sodium content and potassium content)

On a platinum tray, 100 g of a sample was collected and heated in an electric oven at 550° C. for about twenty-four hours, thereby subjecting the sample to ashing. Thereafter, 2 ml of 20% hydrochloric acid and 5 ml of pure water were added to the resulting ash, and the mixture was heated for 10 minutes at 50° C. by a hot plate, thereby preparing a sample for analysis. Then, 10 ml of the sample for analysis was measured out into a measuring flask, and the concentration of a sodium or potassium content in the sample was measured from comparison with a sodium or potassium standard solution for a calibration curve by using an atomic absorption spectrometer (single-droplet method; 589.0 nm; flame analysis).

(Iron content, titanium content and silicon content)

The sample for analysis prepared as described above was subjected to quantitative analysis by ICP (plasma emission spectroscopic analysis).

(Volume resistivity measuring method)

Volume resistivity was measured by a volume resistivity test based on the electrical insulating oil testing method according to JIS C 2101.

(Hydrolytic stability)

In an iron container having an internal volume of 350 ml, 250 ml of a sample oil or a comparative oil was placed, together with a copper wire, aluminum wire and iron wire (each having an inner diameter of 8 mm and a length of 30 mm) as catalysts, 1,000 ppm of water, and 40 g of Freon 134a as a refrigerant, and heated for 20 days at 175° C. Thereafter, the oil was taken out, and the total acid number was measured by the neutralization value testing method according to JIS K 2501.

[Specific Example 1]

One mole of pentaerythritol and 4 moles of $C_5$ to $C_9$ fatty acid were subjected to ordinary esterification reaction [catalyst: Ti(OC$_4$H$_9$)$_4$], and 56 g of potassium hydroxide was added to the resulting product to neutralize the catalyst. Thereafter, the product was purified by rinsing in distilled water, thereby preparing a sample oil 1. The sodium content in the purified ester was 0.01 ppm, while the silicon content was 0.02 ppm, and the acid number was 0.01 mgKOH/g. It should be noted that none of potassium, iron and titanium contents were detected from the sample oil 1.

Next, the sample oil 1 was passed through a column filled with silica gel, and thereafter subjected to analysis. As a result, no change was observed with regard to the sodium content and the acid number, but the silicon content was 0.61 ppm. This sample was used as a sample oil 2.

Ti(OC$_4$H$_9$)$_4$ as an esterification catalyst was added to the sample oil 1 so that the titanium content was 3.2 ppm, thereby preparing a sample oil 3.

Meanwhile, 10 g of iron powder was added to 100 g of caproic acid, and the mixture was heated for 3 hours at 100° C. in a stream of nitrogen. Thereafter, the iron powder was filtered out, thereby preparing an iron caproate solution. The iron caproate solution was added to the sample oil 1 so that the iron content was 0.40 ppm, thereby preparing a sample oil 4.

[Comparative Example 1]

Sodium caproate was added to the sample oil 1 so that the sodium content was 0.40 ppm, thereby preparing a comparative oil 1.

[Comparative Example 2]

Potassium caproate was added to the sample oil 1 so that the potassium content was 0.40 ppm, thereby preparing a comparative oil 2.

[Comparative Example 3]

Caproic acid was added to the sample oil 1 so that the acid number was 1.0 mgKOH/g, thereby preparing a comparative oil 3.

[Specific Example 2]

Dipentaerythritol and $C_5$ and $C_6$ fatty acid ($C_5$ component: 30% by weight; $C_6$ component: 70% by weight) were subjected to esterification reaction [catalyst: $Ti(OC_4H_9)_4$] in the molar ratio of 1:6, thereby preparing an ester (viscosity: 72 $mm^2$/s at 40° C.). To the ester, 56 g of potassium hydroxide was added to neutralize the catalyst. Thereafter, the ester was purified by rinsing in distilled water, thereby preparing a sample oil 5.

The sodium content in the purified ester was 0.07 ppm, while the silicon content was 0.70 ppm, and the acid number was 0.01 mgKOH/g. It should be noted that none of potassium, iron and titanium contents were detected from the sample oil 5.

[Specific Example 3]

One mole of pentaerythritol and 4 moles of 3,5,5-trimethylnonanoic chloride were subjected to non-catalytic esterification reaction. Thereafter, 74 g of calcium hydroxide was added to the resulting ester to effect neutralization, and the resulting precipitate was filtered out. The ester was then purified by rinsing in distilled water, thereby preparing a sample oil 6. The sodium content in the sample oil 6 was 0.07 ppm, and the silicon content was 0.02 ppm.

[Comparative Example 4]

A carbonic acid ester (trade name: LIARCARB SR/1000; manufactured by MITECS) of the type represented by the above-described formula (VII) was used as a comparative oil 4. The sodium content in the comparative oil 4 was 0.23 ppm.

[Specific Example 4]

To 100 g of the carbonic acid ester used as the comparative oil 4, 12 g of inorganic ion exchanger IXE 600 (manufactured by Toa Gosei Chemical Industry Co., Ltd.) was added, and the mixture was stirred for 12 hours. Thereafter, filtration was performed to prepare a sample oil 7. The sodium content in the sample oil 7 was 0.08 ppm.

The sample oils 1 to 7 (present invention) and the comparative oils 1 to 4 were tested for volume resistivity and hydrolytic stability (acid number) by the above-described testing methods. The results of the testing are shown in Table 1 below.

TABLE 1

|  | Volume resistivity Ω-cm, 25° C. | Hydrolytic stability mgKOH/g |
| --- | --- | --- |
| Sample oil 1 | $1.8 \times 10^{14}$ | 0.03 |
| Sample oil 2 | $1.4 \times 10^{14}$ | 0.03 |
| Sample oil 3 | $9.0 \times 10^{13}$ | 0.03 |
| Sample oil 4 | $5.0 \times 10^{13}$ | 0.05 |
| Sample oil 5 | $1.5 \times 10^{13}$ | 0.07 |
| Sample oil 6 | $4.5 \times 10^{14}$ | 0.03 |
| Sample oil 7 | $5.0 \times 10^{13}$ | 0.03 |
| Comparative oil 1 | $6.6 \times 10^{11}$ | 2.80 |
| Comparative oil 2 | $2.0 \times 10^{12}$ | 0.85 |
| Comparative oil 3 | $3.5 \times 10^{13}$ | 1.56 |
| Comparative oil 4 | $8.0 \times 10^{12}$ | 0.03 |

It will be understood from the table that the ester oils in the refrigerating machine oils of the present invention are excellent in insulating properties and have favorably low hydrolyzability.

Next, specific examples of refrigerating machine oils will be shown.

[Specific Example 5]

One mole of pentaerythritol and 2-ethylhexanoic acid were subjected to ordinary esterification reaction [catalyst: $Ti(OC_4H_9)_4$], and 56 g of potassium hydroxide was added to the resulting product to neutralize the catalyst. Thereafter, the product was purified by rising in distilled water, thereby preparing an ester oil. Physical properties of the ester oil are shown below:

Volume resistivity: $1 \times 10^{14}$ Ω-cm (25° C.)

Sodium concentration: 0.01 ppm

Silicon content: 0.02 ppm

Acid number: 0.01 mgKOH/g

None of potassium, iron and titanium contents were detected.

To the ester oil, tricresyl phosphate (sodium concentration: 0.15 ppm) was added in the proportion of 2.0% by weight, thereby preparing a sample oil 8. The sodium concentration in the refrigerating machine oil thus obtained was 0.013 ppm.

[Specific Example 6]

To the ester oil prepared in Specific Example 5, trioctyl phosphate [$(C_8H_{17}O)_3$—P=O; sodium concentration: 0.32 ppm] was added in the proportion of 2.0% by weight, thereby preparing a sample oil 9. The sodium concentration in the refrigerating machine oil thus obtained was 0.016 ppm.

[Specific Example 7]

To the ester oil prepared in Specific Example 5, [$(C_{18}H_{35}O)_3$—P=O; sodium concentration: 0.35 ppm] was added in the proportion of 2.0% by weight, thereby preparing a sample oil 10. The sodium concentration in the refrigerating machine oil thus obtained was 0.017 ppm.

[Specific Example 8]

To the ester oil prepared in Specific Example 5, a compound (sodium concentration: 0.28 ppm) represented by the following structural formula was added in the proportion of 2.0% by weight, thereby preparing a sample oil 11. The sodium concentration in the refrigerating machine oil thus obtained was 0.016 ppm.

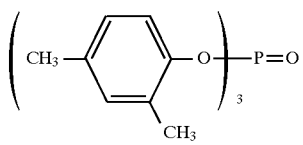

[Specific Example 9]
To the ester oil prepared in Specific Example 5, n-butoxyethyl phosphate [(C$_4$H$_9$—O—C$_2$H$_4$—O—)$_3$—P=O; sodium concentration: 0.35 ppm] was added in the proportion of 2.0% by weight, thereby preparing a sample oil 12. The sodium concentration in the refrigerating machine oil thus obtained was 0.017 ppm.

[Comparative Example 5]
To the ester oil prepared in Specific Example 5, tricresyl phosphate (sodium concentration: 5.2 ppm) was added in the proportion of 2.0% by weight, thereby preparing a comparative oil 5. The sodium concentration in the refrigerating machine oil thus obtained was 0.114 ppm.

[Comparative Example 6]
To the ester oil prepared in Specific Example 5, a compound of the same type as that used as an additive in the above-described Specific Example 8 but having a sodium concentration of 6.6 ppm was added in the proportion of 2.0% by weight, thereby preparing a comparative oil 6. The sodium concentration in the refrigerating machine oil thus obtained was 0.142 ppm.

[Comparative Example 7]
To the ester oil prepared in Specific Example 5, n-butoxyethyl phosphate [(C$_4$H$_9$—O—C$_2$H$_4$—O—)$_3$—P=O; sodium concentration: 5.8 ppm] was added in the proportion of 2.0% by weight, thereby preparing a comparative oil 7. The sodium concentration in the refrigerating machine oil thus obtained was 0.126 ppm.

The volume resistivity of each of the above-described refrigerating machine oils was measured. The results of the measurement are shown in Table 2.

TABLE 2

| | Volume resistivity [Ω-cm (25° C.)] |
|---|---|
| Sample oil 8 | 1.4 × 10$^{14}$ |
| Sample oil 9 | 1.3 × 10$^{14}$ |
| Sample oil 10 | 1.2 × 10$^{14}$ |
| Sample oil 11 | 1.3 × 10$^{14}$ |
| Sample oil 12 | 1.3 × 10$^{14}$ |
| Comparative oil 5 | 9.0 × 10$^{12}$ |
| Comparative oil 6 | 7.8 × 10$^{12}$ |
| Comparative oil 7 | 8.5 × 10$^{12}$ |

It will be understood from the table that the refrigerating machine oils of the present invention are excellent in insulating properties.

[Specific Example 10]
Sodium caproate was added to the sample oil 1 so that the sodium content was 0.09 ppm, thereby preparing a sample oil 13.

[Specific Example 11]
Potassium caproate was added to the sample oil 1 so that the potassium content was 0.09 ppm, thereby preparing a sample oil 14.

[Comparative Example 8]
Sodium caproate was added to the sample oil 1 so that the sodium content was 0.12 ppm, thereby preparing a comparative oil 8.

[Comparative Example 9]
Potassium caproate was added to the sample oil 1 so that the potassium content was 0.13 ppm, thereby preparing a comparative oil 9.

[Specific Example 12]
To the ester oil prepared in Specific Example 5, tricresyl phosphate (sodium concentration: 3.51 ppm) was added in the proportion of 2.0% by weight, thereby preparing a sample oil 15. The sodium concentration in the refrigerating machine oil thus obtained was 0.08 ppm.

[Specific Example 13]
To the ester oil prepared in Specific Example 5, a compound (sodium concentration: 3.76 ppm) represented by the following structural formula was added in the proportion of 2.0% by weight, thereby preparing a sample oil 16. The sodium concentration in the refrigerating machine oil thus obtained was 0.085 ppm.

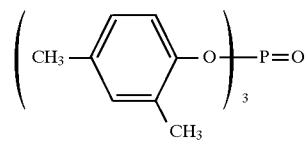

[Specific Example 14]
To the ester oil prepared in Specific Example 5, n-butoxy phosphate [(C$_4$H$_9$—O—C$_2$H$_4$—O—)$_3$—P=O; sodium concentration: 3.50 ppm] was added in the proportion of 2.0% by weight, thereby preparing a sample oil 17. The sodium concentration in the refrigerating machine oil thus obtained was 0.08 ppm.

The volume resistivity of each of the above-described refrigerating machine oils was measured. The results of the measurement are shown in Table 3.

TABLE 3

| | Volume resistivity [Ω-cm (25° C.)] |
|---|---|
| Sample oil 13 | 8.4 × 10$^{13}$ |
| Sample oil 14 | 7.9 × 10$^{13}$ |
| Sample oil 15 | 3.8 × 10$^{13}$ |
| Sample oil 16 | 4.5 × 10$^{13}$ |
| Sample oil 17 | 4.0 × 10$^{13}$ |
| Comparative oil 8 | 8.6 × 10$^{12}$ |
| Comparative oil 9 | 9.5 × 10$^{12}$ |

It will be understood from the table that the refrigerating machine oils of the present invention are excellent in insulating properties.

Regarding the above-described sample oils 1 to 17 and comparative oils 1 to 9 concerned with the first refrigerating machine oil of the present invention, the relationship between the sodium and/or potassium concentration (ppm) and volume resistivity [(Ω-cm (25° C.)] of each oil is plotted in FIG. 1. It will be understood from FIG. 1 that the first refrigerating machine oil of the present invention has a sodium and/or potassium concentration of not higher than 0.1 ppm; consequently, it can exhibit a volume resistivity of not lower than 10$^{13}$ [Ω-cm (25° C.) ] and hence excellent insulating properties. It should be noted that the comparative oil 3 is excellent in insulating properties but inferior in hydrolytic stability because of its high acid number.

Next, the second refrigerating machine oil of the present invention will be described.

The second refrigerating machine oil of the present invention is composed mainly of an ester of pentaerythritol and a carboxylic acid. The carboxylic acid is a mixed carboxylic acid composed of 3,5,5-trimethylhexanoic acid and a straight-chain or branched fatty acid having from 6 to 8 carbon atoms, and the proportion of 3,5,5-trimethylhexanoic acid in the mixed carboxylic acid is in the range of from more than 50 mol % to not more than 90 mol %, preferably from 60 mol % to 90 mol %.

Examples of the carboxylic acid component include straight-chain or branched fatty acids having from 6 to 8 carbon atoms. Preferable fatty acids are 2-ethylhexanoic acid, 2-methylhexanoic acid, 2,2-dimethylbutyric acid, hexanoic acid, heptanoic acid, isohexanoic acid, isoheptanoic acid, etc.

The second refrigerating machine oil of the present invention is desired to have a volume resistivity of not lower than $2 \times 10^{14}$ Ω-cm (25° C.) in the state of an ester oil consisting of the base oil only. In the state of a refrigerating machine oil composition containing various additives the second refrigerating machine oil of the present invention is desired to have a viscosity of not lower than 68 mm$^2$/s at 40° C. and a volume resistivity of not lower than $2 \times 10^{13}$ Ω-cm (25° C.). To meet these demands, it is necessary that the proportion of 3,5,5-trimethylhexanoic acid in the mixed carboxylic acid, which is composed of 3,5,5-trimethylhexanoic acid and a straight-chain or branched fatty acid having from 6 to 8 carbon atoms, should exceed 60 mol %. If the proportion of 3,5,5-trimethylhexanoic acid is less than 60 mol %, the viscosity of the ester, when mixed with various additives in order to use it as a refrigerating machine oil, cannot be 68 mm$^2$/s or higher at 40° C. If the proportion of 3,5,5-trimethylhexanoic acid exceeds 90 mol %, the fluidity at low temperature becomes degraded, so that the refrigerating machine oil may crystallize, and the compatibility with the refrigerant at low temperature degrades.

Pentaerythritol and a mixed acid are esterified in the proportions of from 4 to 6 moles of the mixed acid to 1 mole of pentaerythritol under the ordinary esterification conditions that esterification reaction is carried out in the presence of an acid catalyst, e.g., phosphoric acid.

The ester obtained by the above-described preparation has a total acid number such as that described with regard to the first refrigerating machine oil and contains impurities as described above. Therefore, the ester should be treated so as to have a total acid number, overall concentration of sodium and potassium contents, peroxide number, aldehyde number and bromine number, which are similar to those of the first refrigerating machine oil, by the method described in connection with the first refrigerating machine oil.

Further, in the second refrigerating machine oil of the present invention, it is possible to use other esters in combination with the ester oil composed of pentaerythritol and a mixed acid, for the purpose of adjusting the viscosity, within the range in which the proportion of the added ester to the ester oil will not exceed 50% by weight. Examples of usable esters are organic carboxylates, e.g., polyol esters, diesters, etc., fumarate oligomers, carbonic acid esters, hydroxypivalates, and combinations of these esters. It should be noted that these esters are inferior to the ester oil composed of pentaerythritol and a mixed acid in the present invention in one of the following properties, i.e., insulating properties, stability, and compatibility; therefore, they should be mixed with the ester oil within the range in which the performance will not be impaired.

It should be noted that it is also preferable in the second refrigerating machine oil of the present invention that the ester oil, which is composed of pentaerythritol and a mixed acid, should contain additives, e.g., an antioxidant, a corrosion inhibitor, an antiwear agent, an anti-foaming agent, a metal deactivator, a rust preventive, and a stabilizer, as described with regard to the first refrigerating machine oil, in the same proportions as those in the first refrigerating machine oil.

[Specific Example 15]
(Sample Oil 18)

One mole of pentaerythritol and 6 moles of a mixed acid composed of 90 mol % of 3,5,5-trimethylhexanoic acid and 10 mol % of 2-ethylhexanoic acid were subjected to ordinary esterification reaction [catalyst: Ti(OC$_4$H$_9$)$_4$], and 56 g of potassium hydroxide was added to the resulting product to neutralize the catalyst. Thereafter, the product was purified by rinsing in distilled water, thereby preparing a sample oil 18.

(Sample Oil 19)

A sample oil 19 was prepared by carrying out esterification reaction in the same way as in the case of the sample oil 18 except that the mixed acid in the sample oil 18 was replaced by a mixed acid composed of 80 mol % of 3,5,5-trimethylhexanoic acid and 20 mol % of 2-ethylhexanoic acid.

(Sample Oil 20)

A sample oil 20 was prepared by carrying out esterification reaction in the same way as in the case of the sample oil 18 except that the mixed acid in the sample oil 18 was replaced by a mixed acid composed of 70 mol % of 3,5,5-trimethylhexanoic acid and 30 mol % of 2-ethylhexanoic acid. The sodium content in the sample oil 20 was 0.01 ppm, while the silicon content was 0.02 ppm, and the acid number was 0.01 mgKOH/g. None of potassium, iron and titanium contents were detected.

(Sample Oil 21)

A sample oil 21 was prepared by carrying out esterification reaction in the same way as in the case of the sample oil 18 except that the mixed acid in the sample oil 18 was replaced by a mixed acid composed of 60 mol % of 3,5,5-trimethylhexanoic acid and 40 mol % of 2-ethylhexanoic acid.

(Comparative Oil 10)

A comparative oil 10 was prepared by carrying out esterification reaction in the same way as in the case of the sample oil 18 except that the mixed acid in the sample oil 18 was replaced by a mixed acid composed of 50 mol % of 3,5,5-trimethylhexanoic acid and 50 mol % of 2-ethylhexanoic acid.

(Comparative Oil 11)

A comparative oil 11 was prepared by carrying out esterification reaction in the same way as in the case of the sample oil 18 except that the mixed acid in the sample oil 18 was replaced by 100% 3,5,5-trimethylhexanoic acid.

(Comparative Oil 12)

A comparative oil 12 was prepared by carrying out esterification reaction in the same way as in the case of the sample oil 18 except that the mixed acid in the sample oil 18 was replaced by 100% 2-ethylhexanoic acid.

(Comparative Oil 13)

A comparative oil 13 was prepared by carrying out esterification reaction in the same way as in the case of the sample oil 18 except that the mixed acid in the sample oil 18 was replaced by a mixed acid composed of 90 mol % of 3,5,5-trimethylhexanoic acid and 10 mol % of n-decanoic acid.

(Comparative Oil 14)

A comparative oil 14 was prepared by carrying out esterification reaction in the same way as in the case of the sample oil 18 except that the mixed acid in the sample oil 18 was replaced by a mixed acid composed of 80 mol % of 3,5,5-trimethylhexanoic acid, 10 mol % of 2-ethylhexanoic acid, and 10 mol % of n-decanoic acid.

(Comparative Oil 15)

One mole of pentaerythritol and 8 moles of a mixed acid composed of 50 mol % of n-hexanoic acid (n-$C_5$ acid) and 50 mol % of isobutyric acid (i-$C_5$ acid) were subjected to ordinary esterification reaction [catalyst: Ti(OC$_4$H$_9$)$_4$], and 84 g of potassium hydroxide was added to the resulting product to neutralize the catalyst. Thereafter, the product was purified by rinsing in distilled water, thereby preparing a comparative oil 15.

(Comparative Oil 16)

Polypropylene glycol dimethyl ether (viscosity: 42.1 mm$^2$/s at 40° C.) was used as a comparative oil 16.

The above-described sample oils 18 to 21 and comparative oils 10 to 16 were measured with regard to viscosity at 40° C. and 100° C., compatibility with the refrigerant R134a, volume resistivity (Ω-cm) and low-temperature fluidity.

The results of the measurement are shown in Table 4.

[Specific Example 16]

(Sample Oil 22)

One mole of pentaerythritol and 6 moles of a mixed acid composed of 60% by weight of 3,5,5-trimethylhexanoic acid and 40% by weight of 2-ethylhexanoic acid were subjected to ordinary esterification reaction [catalyst: Ti(OC$_4$H$_9$)$_4$], and 56 g of potassium hydroxide was added to the resulting product to neutralize the catalyst. Thereafter, the product was purified by rinsing in distilled water, thereby preparing an ester oil.

To the ester oil, glycidyl benzoate, 2,6-di-t-butyl phenol and tricresyl phosphate were added as additives so that the contents thereof were 3%, 0.5% and 1.3% by weight, respectively, thereby preparing a sample oil 22.

(Comparative Oil 17)

The ester oil in the sample oil 22 was replaced by the comparative oil 10, and additives were added thereto in the same way as in the case of the sample oil 22, thereby preparing a comparative oil 17.

The sample oil 22 and the comparative oil 17 were measured with regard to viscosity at 40° C. and 100° C., compatibility with the refrigerant R134a, volume resistivity (Ω-cm) and low-temperature fluidity in the same way as the above.

The results of the measurement are shown in Table 5.

TABLE 4

| | Viscosity mm$^2$/s | | Compatibility | | Volume resistivity | Low-temperature |
|---|---|---|---|---|---|---|
| | 40° C. | 100° C. | Low temp. | High temp. | Ω – cm | fluidity at −20° C. |
| Sample oil 18 | 107 | 10.9 | −40° C. or lower | 80° C. or higher | 3.0 × 10$^{14}$ | Not crystallized for 30 days |
| Sample oil 19 | 92.7 | 10.1 | −40° C. or lower | 80° C. or higher | 2.5 × 10$^{14}$ | Not crystallized for 30 days |
| Sample oil 20 | 82.9 | 9.4 | −40° C. or lower | 80° C. or higher | 3.5 × 10$^{14}$ | Not crystallized for 30 days |
| Sample oil 21 | 74.8 | 8.7 | −40° C. or lower | 90° C. or higher | 2.0 × 10$^{14}$ | Not crystallized for 30 days |
| Comp. oil 10 | 68.3 | 8.4 | −40° C. or lower | 80° C. or higher | 1.2 × 10$^{14}$ | Not crystallized for 30 days |
| Comp. oil 11 | 110 | 11.0 | −21° C. | 80° C. or higher | 2.0 × 10$^{14}$ | Crystallized in 1 day |
| Comp. oil 12 | 44.4 | 6.3 | −40° C. or lower | 80° C. or higher | 1.8 × 10$^{14}$ | Crystallized in 2 days |
| Comp. oil 13 | 111 | 11.3 | 0° C. | 80° C. or higher | 1.2 × 10$^{14}$ | Crystallized in 3 days |
| Comp. oil 14 | 107 | 10.7 | −17° C. | 80° C. or higher | 1.5 × 10$^{14}$ | Crystallized in 5 days |
| Comp. oil 15 | 72.5 | 10.1 | −40° C. or lower | 80° C. or higher | 3.5 × 10$^{13}$ | Not crystallized for 30 days |
| Comp. oil 16 | 42.1 | 9.3 | −40° C. or lower | 80° C. or higher | 1.2 × 10$^{11}$ | Not crystallized for 30 days |

TABLE 5

| | Viscosity mm²/s | | Compatibility | | Volume resistivity | Low-temperature |
|---|---|---|---|---|---|---|
| | 40° C. | 100° C. | Low temp. | High temp. | Ω – cm | fluidity at −20° C. |
| Sample oil 22 | 68.2 | 7.9 | −40° C. or lower | 80° C. or higher | $2.0 \times 10^{13}$ | Not crystallized for 30 days |
| Comp. oil 17 | 60.5 | 7.5 | −40° C. or lower | 80° C. or higher | $1.2 \times 10^{13}$ | Not crystallized for 30 days |

It will be understood from Tables 4 and 5 that if a mixed acid in which the content of 3,5,5-trimethylhexanoic acid is not higher than 50% in molar ratio is used (comparative oils 10 and 17), the volume resistivity lowers, and when mixed with additives, the ester oil becomes unable to maintain the viscosity at 68 mm²/s or higher at 40° C. It will also be understood that esters of 100% a fatty acid having 8 or 9 carbon atoms (comparative oils 11 and 12) crystallize, and that an ester of 100% a fatty acid having 8 carbon atoms has low viscosity. Further, it will be understood that esters containing a fatty acid having 10 or more carbon atoms (comparative oils 13 and 14) cannot solve the problem in terms of crystallizability.

It will be understood that esters that use dipentaerythritol (comparative oil 15) or polyalkylene glycol (comparative oil 16) as an alcohol component exhibit a low volume resistivity.

[Specific Example 17]
(Sample Oil 23)
One mole of pentaerythritol and 6 moles of a mixed acid composed of 90% by weight of 3,5,5-trimethylhexanoic acid and 10% by weight of 2-methylhexanoic acid were subjected to ordinary esterification reaction [catalyst: Ti(OC$_4$H$_9$)$_4$], and 56 g of potassium hydroxide was added to the resulting product to neutralize the catalyst. Thereafter, the product was purified by rinsing in distilled water, thereby preparing a sample oil 23.
(Comparative Oil 18)
One mole of pentaerythritol and 6 moles of 3,5,5-trimethylhexanoic acid were subjected to ordinary esterification reaction [catalyst: Ti(OC$_4$H$_9$)$_4$], and 56 g of potassium hydroxide was added to the resulting product to neutralize the catalyst. Thereafter, the product was purified by rinsing in distilled water, thereby preparing an ester oil A.

One mole of pentaerythritol and 6 moles of 2-ethylhexanoic acid were subjected to ordinary esterification reaction [catalyst: Ti(OC$_4$H$_9$)$_4$], and 56 g of potassium hydroxide was added to the resulting product to neutralize the catalyst. Thereafter, the product was purified by rinsing in distilled water, thereby preparing an ester oil B.

The ester oils A and B prepared as described above were mixed together in the proportions of 60% to 40% by weight, thereby preparing a comparative oil 18.
(Comparative Oil 19)
The proportions of the ester oils A and B in the ester mixture in the comparative oil 18 were changed. That is, the ester oils A and B were mixed together in the proportions of 30% to 70% by weight, thereby preparing a comparative oil 19.

The sample oil 23 and comparative oils 18 and 19 were measured with regard to viscosity at 40° C. and 100° C., compatibility with the refrigerant R134a, volume resistivity (Ω-cm ) and low-temperature fluidity in the same way as the above.

The results of the measurement are shown in Table 6.

TABLE 6

| | Viscosity mm²/s | | Compatibility | | Volume resistivity | Low-temperature |
|---|---|---|---|---|---|---|
| | 40° C. | 100° C. | Low temp. | High temp. | Ω – cm | fluidity at −20° C. |
| Sample oil 23 | 95.7 | 10.2 | −40° C. or lower | 80° C. or higher | $2.0 \times 10^{14}$ | Not crystallized for 30 days |
| Comp. oil 18 | 74.2 | 8.5 | −40° C. or lower | 80° C. or higher | $1.8 \times 10^{14}$ | Crystallized in 2 days |
| Comp. oil 19 | 57.2 | 7.4 | −40° C. or lower | 80° C. or higher | $1.8 \times 10^{13}$ | Crystallized in 7 days |

It will be understood from the table that blends of esters (comparative oils 18 and 19) cannot solve the problem in terms of crystallizability.

(Oxidation Stability)

In an iron container having an internal volume of 350 ml, 250 ml of the sample oil 22 or the comparative oil 10 or 17 was placed, together with a copper wire, aluminum wire and iron wire (each having an inner diameter of 8 mm and a length of 30 mm) as catalysts, 1,000 ppm of water, 40 g of Freon 134a as a refrigerant, and 100 ml of air, and heated for 20 days at 175° C. Thereafter, the oil was taken out, and the total acid number (mgKOH/g) was measured by the neutralization value testing method according to JIS K 2501. The results of the measurement are shown in Table 7.

TABLE 7

| | Total acid number (mgKOH/g) |
|---|---|
| Sample oil 22 | 0.05 |
| Comparative oil 10 | 1.2 |
| Comparative oil 17 | 0.05 |

It will be understood from the table that the refrigerating machine oil of the present invention is superior to the comparative oil 10 in oxidation stability, and that when various additives are added to the comparative oil 10 in order to ensure the stability of the refrigerating machine oil, the viscosity lowers, and the refrigerating machine oil becomes unsuitable for the use application of the present invention.

Industrial Applicability

The present invention provides refrigerating machine oils used in refrigerating machines that use a non-chlorine, fluorine-containing refrigerant. The first refrigerating machine oil of the present invention is excellent in hydrolytic stability and insulating properties. The second refrigerating machine oil of the present invention is excellent in low-temperature fluidity and insulating properties. Thus, the present invention provides excellent refrigerating machine oils for large-sized air conditioning equipment, room air conditioners, and refrigerators.

What is claimed is:

1. A composition for use in refrigerating machines comprising:

a refrigerating machine oil comprising an ester oil selected from the group consisting of polyol esters, polycarboxylates, fumarate oligomers, carbonic acid esters, hydroxypivalates, and mixtures thereof, and an additive comprising an antiwear agent selected from the group consisting of a phosphate compound, a phosphorus compound, and a compound of the formula $(RO)_3P=S$, wherein R is an alkyl, allyl, or phenyl group, wherein the refrigerating machine oil has a sodium or potassium concentration of not higher than 0.1 ppm and a volume resistivity of $1\times10^{13}$ $\Omega$-cm at 25° C. or higher, and a non-chlorine, fluorine-containing refrigerant.

2. The composition of claim 1, wherein the refrigerating machine oil has an acid number less than 0.1 mgKOH/g.

3. The composition of claim 1, wherein the refrigerating machine oil has a viscosity in the range from 10 mm$^2$/s to 500 mm$^2$/s at 40° C.

4. The composition of claim 1, wherein the refrigerating machine oil comprises at least one additional additive selected from the group consisting of an antioxidant, a corrosion inhibitor, an anti-foaming agent, a metal deactivator and a rust preventive.

5. A process of making a composition for use in refrigerating machines comprising:

mixing a refrigerating machine oil comprising an ester oil selected from the group consisting of polyol esters, polycarboxylates, fumarate oligomers, carbonic acid esters, hydroxypivalates, and mixtures thereof and an additive comprising an antiwear agent selected from the group consisting of a phosphate compound, a phosphorus compound, and a compound of the formula $(RO)_3P=S$, wherein R is an alkyl, allyl, or phenyl group, wherein the refrigerating machine oil has a sodium or potassium concentration of not higher than 0.1 ppm and a volume resistivity of $1\times10^{13}$ $\Omega$-cm at 25° C. or higher, with a non-chlorine, fluorine-containing refrigerant.

6. The process of claim 5, wherein the refrigerating machine oil has an acid number less than 0.1 mgKOH/g.

7. The process of claim 5, wherein the refrigerating machine oil is adjusted to a viscosity in the range from 10 mm$^2$/s to 500 mm$^2$/s at 40° C.

8. The process of claim 5, wherein the refrigerating machine oil comprises at least one additional additive selected from the group consisting of an antioxidant, a corrosion inhibitor, an anti-foaming agent, a metal deactivator and a rust preventive.

* * * * *